US011702321B2

United States Patent
Liu et al.

(10) Patent No.: US 11,702,321 B2
(45) Date of Patent: Jul. 18, 2023

(54) TRACTION MACHINE ASSEMBLY AND ELEVATOR

(71) Applicant: Otis Elevator Company, Farmington, CT (US)

(72) Inventors: RuGuang Liu, Tianjin (CN); GuoChen Gao, Tianjin (CN); Fengkun Zhu, Tianjin (CN)

(73) Assignee: OTIS ELEVATOR COMPANY, Farmington, CT (US)

( * ) Notice: Subject to any disclaimer, the term of this patent is extended or adjusted under 35 U.S.C. 154(b) by 1226 days.

(21) Appl. No.: 16/244,826

(22) Filed: Jan. 10, 2019

(65) Prior Publication Data

US 2019/0210841 A1 Jul. 11, 2019

(30) Foreign Application Priority Data

Jan. 11, 2018 (CN) .......................... 201810025710.8

(51) Int. Cl.
*B66B 15/06* (2006.01)
*B66B 11/04* (2006.01)
(Continued)

(52) U.S. Cl.
CPC .......... *B66B 15/06* (2013.01); *B66B 11/0438* (2013.01); *F16C 19/507* (2013.01); *F16M 11/04* (2013.01); *F16M 11/42* (2013.01)

(58) Field of Classification Search
CPC ... B66B 15/06; B66B 11/0438; B66B 11/005; B66B 11/0055; B66B 11/04;
(Continued)

(56) References Cited

U.S. PATENT DOCUMENTS 3,033,057 A 5/1962 Gray
3,708,001 A 1/1973 Koskinen
(Continued)

FOREIGN PATENT DOCUMENTS

CN 1735553 A 2/2006
CN 201220874 Y 4/2009
(Continued)

OTHER PUBLICATIONS

Moore, Dylan, "Design features of rotary kilns", Cement Kilns, available at: http://www.cementkilns.co.uk/kiln_design.html, accessed: Jan. 10, 2019, 8 pages.
(Continued)

*Primary Examiner* — Jeffrey Donels
(74) *Attorney, Agent, or Firm* — Cantor Colburn LLP

(57) ABSTRACT

A tractor assembly and an elevator. The tractor assembly includes: a traction sheave, having a traction means fitting surface and a first transmission surface on a peripheral surface thereof; a plurality of support wheels, configured to support the traction sheave, and each having a second transmission surface on a peripheral surface thereof; and support wheel bases, configured to support the support wheels through support shafts, wherein the first transmission surface of the traction sheave is in transmitting cooperation with the second transmission surfaces of the plurality of support wheels respectively. According to the tractor assembly and elevator of the present application, the support wheels are disposed to achieve the transmitting cooperation of the traction sheave during operation of the elevator and support the traction sheave, thus omitting the load and drive bearings required by a conventional traction sheave.

20 Claims, 2 Drawing Sheets

(51) Int. Cl.
*F16C 19/50* (2006.01)
*F16M 11/04* (2006.01)
*F16M 11/42* (2006.01)

(58) Field of Classification Search
CPC .... F16C 19/507; F16C 2326/00; F16C 13/04; F16M 11/04; F16M 11/42
See application file for complete search history.

(56) References Cited

U.S. PATENT DOCUMENTS

| | | | |
|---|---|---|---|
| 4,118,180 A | 10/1978 | Bliemeister | |
| 4,344,596 A | 8/1982 | Hjaeresen | |
| 4,403,952 A | 9/1983 | Birch et al. | |
| 6,644,859 B2 | 11/2003 | Koerting | |
| 9,482,384 B2 | 11/2016 | Stuble | |
| 2017/0088400 A1* | 3/2017 | Watson | B66B 11/08 |
| 2018/0251352 A1* | 9/2018 | Ijadi-Maghsoodi | B66D 1/28 |
| 2019/0049182 A1* | 2/2019 | Stutz | F27B 7/2206 |

FOREIGN PATENT DOCUMENTS

| | | |
|---|---|---|
| CN | 101712432 A | 5/2010 |
| CN | 201545582 U | 8/2010 |
| CN | 102417134 A | 4/2012 |
| CN | 202214118 U | 5/2012 |
| CN | 204073136 U | 1/2015 |
| CN | 105102363 A | 11/2015 |
| CN | 205709393 U | 11/2016 |
| CN | 106458521 A | 2/2017 |
| JP | 2002193571 A | 7/2002 |
| JP | 6104582 B2 | 3/2017 |
| WO | 2008061492 A1 | 5/2008 |
| WO | 2017079371 A2 | 5/2017 |
| WO | 2017137831 A1 | 8/2017 |

OTHER PUBLICATIONS

Chinese Application No. 201810025710.8; Issued Aug. 6, 2021; 10 Pages.
Chinese Office Action for Application No. 201810025710.8; dated Jan. 22, 2021; 12 Pages.

* cited by examiner

TRACTION MACHINE ASSEMBLY AND ELEVATOR

FOREIGN PRIORITY

This application claims priority to Chinese Patent Application No. 201810025710.8, filed Jan. 11, 2018, and all the benefits accruing therefrom under 35 U.S.C. § 119, the contents of which in its entirety are herein incorporated by reference.

TECHNICAL FIELD

The present application relates to the field of elevators, and more specifically to a tractor assembly of an elevator.

BACKGROUND ART

As a tool to improve passengers' walking between floors or reduce the walking distance of passengers, passenger transport devices are very common in daily life. Typical examples include escalators and lifts used between floors in shopping malls and moving walkways used for large airports.

The design of the overall structure of such equipment and the structures of components thereof need to consider load capacity, reliability and comfort degree. For example, taking a lift for example, as a junction for connecting an elevator car and a counterweight, a tractor assembly provides important functions such as load bearing and motion transmission. To provide enough support and stable transmission, existing tractor assemblies generally take the arrangement in the form of a traction sheave equipped with high-strength shafts and bearings. Such an arrangement leads to a great apparatus weight and high material costs.

Therefore, how to provide a lightweight tractor assembly without reducing the load capacity and transmission stability has become an urgent technical problem to be solved.

SUMMARY OF THE INVENTION

The present application provides a lightweight tractor assembly and an elevator.

To achieve the objectives of the present application, one aspect of the present application provides a tractor assembly, including: a traction sheave, having a traction means fitting surface and a first transmission surface on a peripheral surface thereof; a plurality of support wheels, configured to support the traction sheave, and each having a second transmission surface on a peripheral surface thereof; and support wheel bases, configured to support the support wheels through support shafts, where the first transmission surface of the traction sheave is in transmitting cooperation with the second transmission surfaces of the plurality of support wheels respectively.

Optionally, the plurality of support wheels are respectively arranged below the traction sheave along a circumferential direction of the traction sheave.

Optionally, the plurality of support wheels are symmetrically arranged in parallel with an axial direction of the traction sheave.

Optionally, the plurality of support wheels is configured as at least one support wheel group, the support wheel group includes at least two support wheels, and each of the support wheels in the support wheel group are symmetrically arranged along a circumferential direction of the traction sheave.

Optionally, the plurality of support wheels is configured as two support wheel groups, and the two support wheel groups are respectively arranged in parallel with an axial direction of the traction sheave and close to two ends of the peripheral surface of the traction sheave.

Optionally, the peripheral surface of the traction sheave is provided with a traction means fitting surface at the middle part and is provided with a first transmission surface at the two ends respectively.

Optionally, the peripheral surface of the traction sheave is provided with a first transmission surface at the middle part and is provided with a traction means fitting surface at the two ends respectively.

Optionally, transmission is enabled through friction between the first transmission surface of the traction sheave and the second transmission surface of the support wheel.

Optionally, transmission is enabled through engagement between the first transmission surface of the traction sheave and the second transmission surface of the support wheel.

Optionally, the traction sheave and the support wheel are configured as magnetic elements, where in a first state, the first transmission surface of the traction sheave and the second transmission surface of the support wheel abut against each other; and in a second state, the first transmission surface of the traction sheave and the second transmission surface of the support wheel are separated from each other.

Optionally, the traction sheave and/or the support wheel are/is provided with a guiding portion, and the traction sheave is in transmitting cooperation with the support wheel under guidance by the guiding portion.

Optionally, the tractor assembly further includes an encoder disposed at an end portion of the support shaft and configured to count the number of rotations of the support shaft.

Optionally, a code of the encoder is not less than 512.

Optionally, a linear velocity ratio of the traction sheave to the support wheel is not less than 4:1.

Optionally, the tractor assembly further includes a traction means, where the traction means is in transmitting cooperation with the traction means fitting surface on the peripheral surface of the traction sheave and is configured to connect an elevator car and an elevator counterweight.

Optionally, the traction means includes a traction belt or a traction rope.

Optionally, the traction means fitting surface is configured as a traction means guiding groove, and the traction means is in transmitting cooperation with the traction sheave along the traction means guiding groove.

Optionally, the tractor assembly further includes a driving component having a stator and a rotor, where the rotor is fixedly connected to the traction sheave.

Optionally, the tractor assembly further includes a mounting base, where the stator is mounted on the mounting base, and the mounting base and the support wheel bases are integrated.

Optionally, the tractor assembly further includes a brake, where the brake is mounted on the mounting base and is controlled to brake the rotor.

To achieve the objectives of the present application, another aspect of the present application provides an elevator, including an elevator car, an elevator counterweight, and the tractor assembly described above, where the tractor assembly is connected to the elevator car and the elevator counterweight respectively.

According to the tractor assembly and elevator of the present application, the support wheels are disposed to achieve the transmitting cooperation of the traction sheave during operation of the elevator and support the traction sheave, thus omitting the load and drive bearings required by a conventional traction sheave. Therefore, not only the weight of the unit is reduced, but also the reserved hollow part of the traction sheave increases the area of ventilation, thus improving the heat dissipation effect of the rotor winding of the traction unit. In addition, this structure is also easy to disassemble/assemble and maintain.

DETAILED DESCRIPTION

Figure 1:
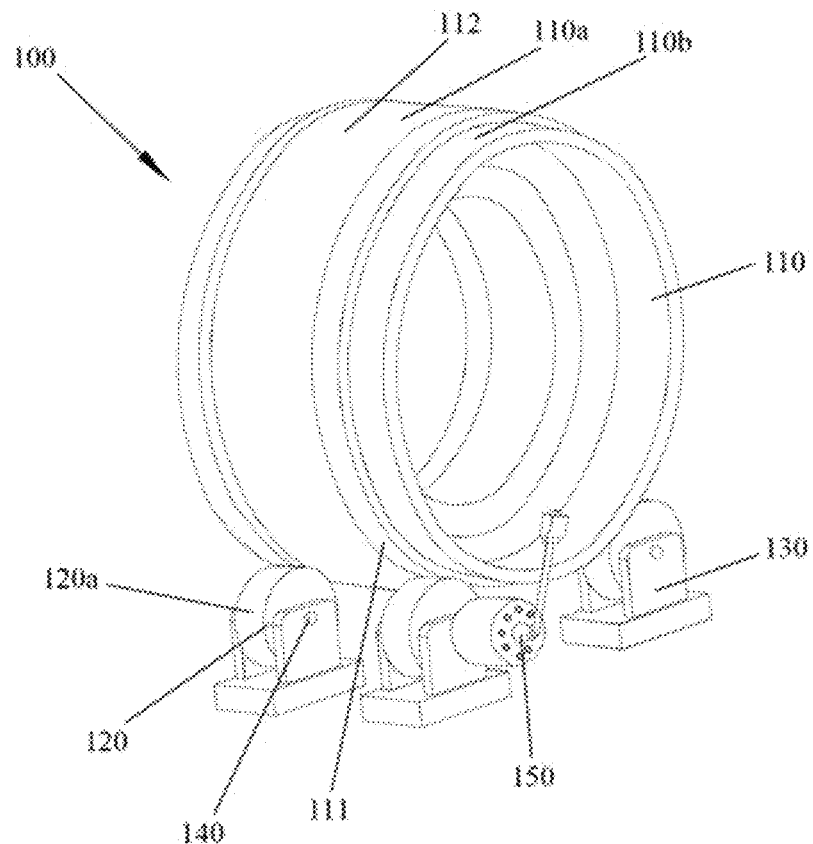
FIG. 1 is a schematic assembled view of a traction sheave and support wheels in a tractor assembly according to an embodiment of the present application.

As shown in FIG. 1, according to an embodiment of the present application, a tractor assembly is provided. The tractor assembly 100 includes: a traction sheave 110 configured to be in transmitting cooperation with a traction means such as a traction rope, and a plurality of support wheels 120 configured to support and be in transmitting cooperation with the traction sheave 110.

Specifically, the traction sheave 110 is constructed as a hollow cylindrical wheel, which, in an assembled state, has a hollow part allowing air to pass through, thus improving the heat dissipation effect of a rotor winding of an electric motor. In addition, the peripheral surface of the traction sheave 110 is provided thereon with a traction means fitting surface 110a and a first transmission surface 110b. The traction means fitting surface 110a is configured to implement general functions of a traction sheave of an elevator, that is, is in transmitting cooperation with the traction means to transmit motion to an elevator car and counterweight. The first transmission surface 110b is configured to be in transmitting cooperation with the support wheels described below, to transfer the load it bears to the support wheels.

Figure 2:
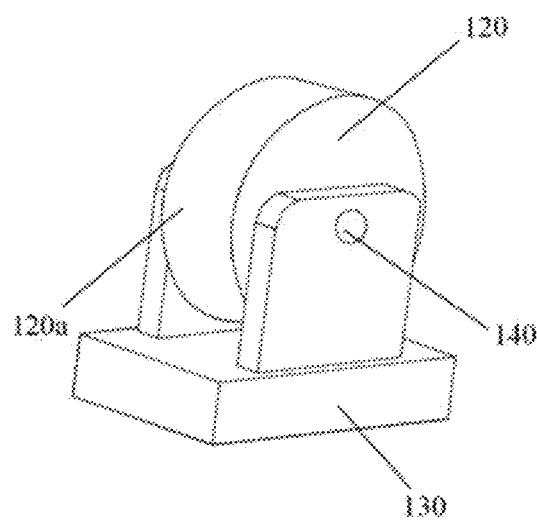
FIG. 2 is a schematic view of the support wheel in FIG. 1 according to an embodiment.

As shown in FIG. 1 and FIG. 2, on the other hand, the support wheels 120 are constructed below the traction sheave 110, so as to bear the traction sheave and its traction components. In addition, the peripheral surface of the support wheel is further provided with a second transmission surface 120a configured to be in transmitting cooperation with the traction means, to ensure stable operation of the traction sheave when driven by the electric motor. Therefore, the support wheel has the function of a bearing, but has a much lower weight than that of a shaft and bearing of a conventional traction sheave. A support wheel base 130 should further be disposed below each of the support wheels 120, to support the support wheel 120 through a support shaft 140. The support wheel bases may be independently disposed below each of the support wheels; or, the support wheel bases may be constructed to have a common base portion, on which protruding bases and support shafts are respectively disposed to support the support wheels. Herein, although the load is transferred to the support wheel base 130 by means of the cooperation between the support shaft 140 and the bearing, the shaft and the bearing herein only need to realize cooperation with the support wheel and has a much lower weight and smaller size than that of a shaft and bearing of a conventional traction sheave.

According to the tractor assembly having such a configuration in the foregoing embodiment, the support wheels 120 are disposed to achieve the transmitting cooperation of the traction sheave 110 during operation of the elevator and support the traction sheave 110, thus omitting the load and drive bearings required by a conventional traction sheave 110. Therefore, not only the weight of the unit is reduced, but also the reserved hollow part of the traction sheave 110 increases the area of ventilation, thus improving the heat dissipation effect of the rotor winding of the traction unit. In addition, this structure is also easy to disassemble/assemble and maintain.

The foregoing embodiment only provides a feasible solution of arrangement of support wheels. Based on this, various improvements may be made to the arrangement form of support wheels, to achieve various different technical effects. Descriptions are given below through examples.

For example, the plurality of support wheels 120 may be respectively arranged below the traction sheave 110 along a circumferential direction of the traction sheave 110. In this case, stable support and transmission can be provided for the traction sheave 110 along its rotation direction. Based on this, the plurality of support wheels 120 may further be symmetrically arranged in parallel with an axial direction of the traction sheave 110. In this case, the traction sheave is supported by multiple support wheels in a direction perpendicular to the rotation direction, and therefore will be prevented from tilting toward two sides, thereby achieving more stable operation.

For another example, the plurality of support wheels 120 may be configured in groups, for example, may be configured as at least one support wheel group. Each of the support wheel groups may include at least two support wheels 120, and the support wheels 120 in the support wheel group are symmetrically arranged along a circumferential direction of the traction sheave 110. In this case, because multiple groups of support wheels are arranged in the circumferential direction of the traction sheave 110, and each group of support wheels provides at least two supporting points for the traction sheave, the stable rotation of the traction sheave is effectively ensured. Based on this, the plurality of support wheels 120 may further be configured as two support wheel groups, and the two support wheel groups are respectively arranged in parallel with an axial direction of the traction sheave 110 and close to two ends of the peripheral surface of the traction sheave 110. In this case, at least four supporting points in the same plane are provided for the traction sheave 110 in the circumferential direction of the traction sheave 110. Therefore, the stable rotation of the traction sheave can better be ensured, and the traction sheave is prevented from tilting toward two sides.

In addition, based on this, various improvements may further be made to the traction sheave in the foregoing embodiment or the cooperation between the traction sheave and the support wheels, to achieve various different technical effects. Descriptions are given below through examples.

For example, the peripheral surface of the traction sheave 110 is provided with a traction means fitting surface 110a at the middle part and is provided with a first transmission surface 110b at the two ends respectively. Such a configuration requires a slight change to the existing structure and has a wide range of application. Alternatively, the peripheral surface of the traction sheave 110 may be provided with a first transmission surface 110b at the middle part and a traction means fitting surface 110a at the two ends respectively.

For another example, transmission can be enabled through friction between the first transmission surface 110b of the traction sheave 110 and the second transmission surface 120a of the support wheel 120. In this case, the two types of transmission surfaces are processed to have high friction. For example, a mesh-shaped texture is provided on the transmission surface, to well achieve stable transmission. Alternatively, transmission can be enabled through engagement between the first transmission surface 110b of the traction sheave 110 and the second transmission surface 120a of the support wheel 120, that is, the transmission between the two is achieved by means of a gear-like structure. This manner is also quite stable but has lower adjustment precision.

Definitely, the manner of transmission between the traction sheave 110 and the support wheel 120 is not limited to the form of contact between the foregoing elements. For example, a magnetic levitation configuration may also be used. Specifically, the traction sheave 110 and the support wheel 120 are configured as magnetic elements, where in a first state, the first transmission surface of the traction sheave 110 and the second transmission surface of the support wheel 120 abut against each other; and in a second state, the first transmission surface of the traction sheave 110 and the second transmission surface of the support wheel 120 are separated from each other. This configuration has higher costs and higher transmission precision and stability.

For another example, the traction sheave 110 and/or the support wheel 120 may further be provided with a guiding portion 111, to ensure that the traction sheave 110 can be in transmitting cooperation with the support wheel 120 under guidance of the guiding portion 111, thereby further improving the reliability of transmission.

In addition, improvements may further be made to other aspects of the foregoing embodiment, to achieve various different technical effects. Descriptions are given below through examples.

For example, the tractor assembly may further include an encoder 150 disposed at an end portion of the support shaft 140 and configured to count the number of rotations of the support shafts 140, so as to achieve the precise control of the traction action of the elevator. Because the object monitored changes from a shaft of a conventional traction sheave to the support shaft of the support wheel, the wheel length decreases significantly, and therefore the code of the encoder can decrease significantly while ensuring the control precision. For example, the code of the encoder 150 may be set to be not less than 512, including, but not limited to, 512, 1024, and so on. For another example, a linear velocity ratio of the traction sheave 110 to the support wheel 120 may be set to be not less than 4:1, including, but not limited to, 6:1; 8:1, and so on. In this way, the wheel length ratio of the traction sheave to the support wheel is reduced, that is, the requirements on the encoder is lowered while ensuring the control precision.

For another example, when a traction means such as a traction belt or a traction rope is mounted on the traction sheave, the traction means is in transmitting cooperation with the traction means fitting surface 110a on the peripheral surface of the traction sheave 110 and is connected to the elevator car and the elevator counterweight through the traction sheave 110, thus achieving the retraction of the two and completing the basic function of the tractor assembly.

Optionally, the traction means fitting surface 110a may be configured as a traction means guiding groove 112. In this case, the traction means is in transmitting cooperation with the traction sheave 110 along the traction means guiding groove 112, making the entire transmission process more reliable.

Figure 3:
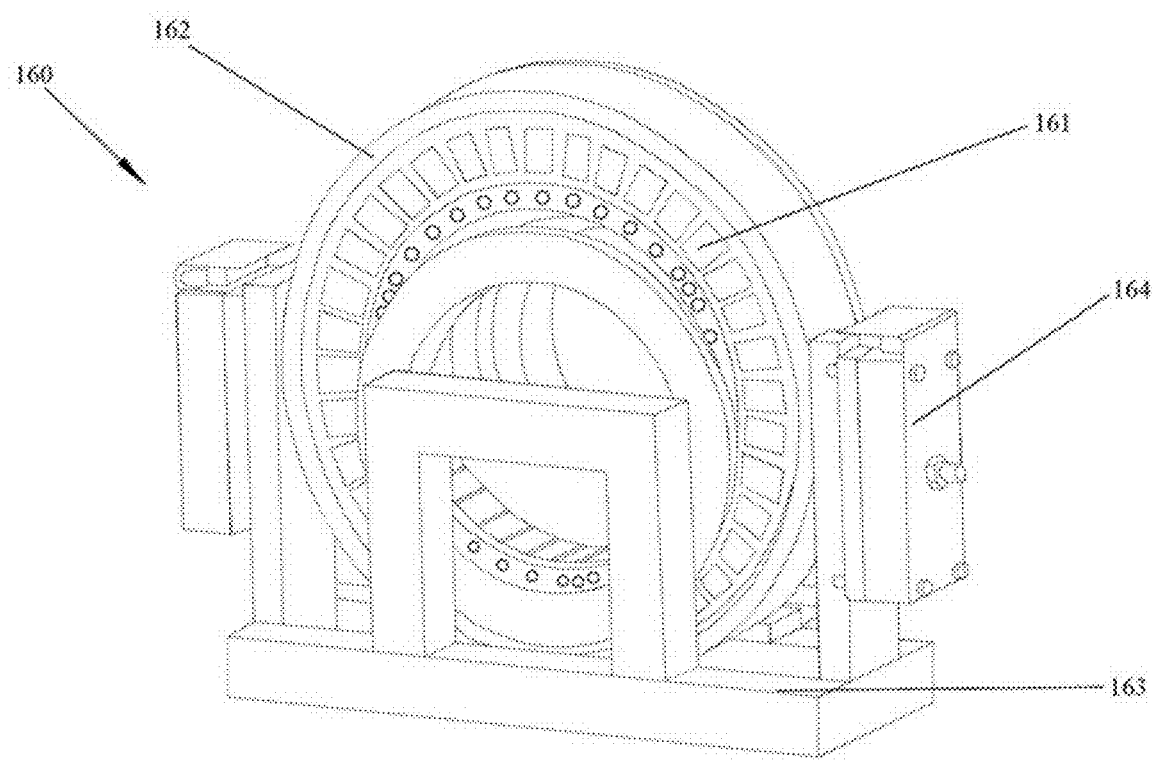
FIG. 3 is a schematic view of a tractor assembly from a first viewing angle according to an embodiment of the present application.
Figure 4:
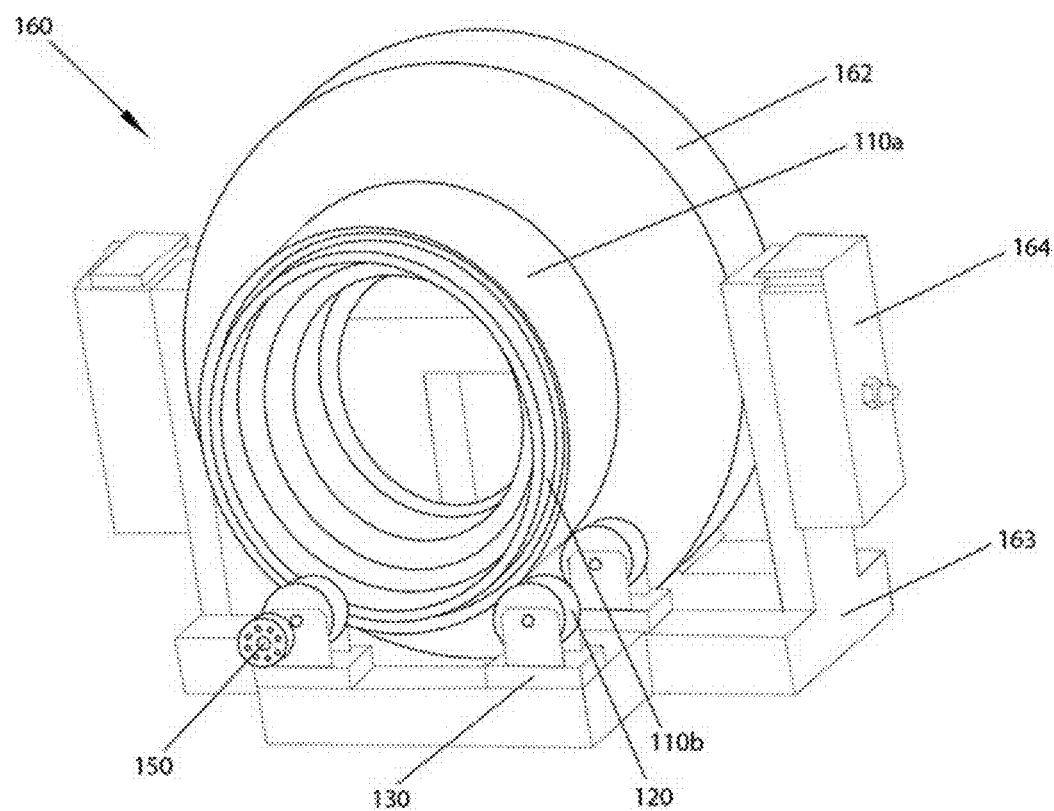
FIG. 4 is a schematic view of a tractor assembly from a second viewing angle according to an embodiment of the present application.

Furthermore, as shown in FIG. 3 and FIG. 4, the traction assembly further includes a driving component 160 having a stator 161, a rotor 162, a mounting base 163, and a brake 164. The rotor 162 is fixedly connected to the traction sheave 110 and can drive the traction sheave 110 to rotate relative to the stator 161. The stator 161 and the brake 164 are mounted on the mounting base 163, and the brake 164 is controlled to brake the rotor 162. In addition, the mounting base 163 and the support wheel bases 130 are integrated, so as to improve the degree of integration of the entire tractor assembly and increase the load bearing strength of the support wheel base.

In addition, another aspect of the present application further provides an embodiment of an elevator, not shown in the figures. The elevator includes an elevator car, an elevator counterweight, and the tractor assembly according to any one of the foregoing embodiments. The tractor assembly is connected to the elevator car and the elevator counterweight respectively. Therefore, with the use of the tractor assembly, the elevator also correspondingly has various technical effects described above, and the details will not be repeated herein.

The above examples mainly describe the tractor assembly and elevator of the present application. Although only some implementations of the present application are described, a person of ordinary skill in the art should understand that the present application can be implemented in many other forms without departing from the gist and scope of the present application. Therefore, the examples and implementations provided herein should be construed as exemplary rather than limiting. The present application can encompass various modifications and replacements made without departing from the spirit and scope the present application as defined by the appended claims.

What is claimed is:

1. A tractor assembly, comprising:
   a traction sheave, having a traction means fitting surface and a first transmission surface on a peripheral surface thereof;
   a plurality of support wheels, configured to support the traction sheave, and each having a second transmission surface on a peripheral surface thereof; and
   support wheel bases, configured to support the support wheels through support shafts,
   wherein the first transmission surface of the traction sheave is in transmitting cooperation with the second transmission surfaces of the plurality of support wheels respectively;
   wherein the traction sheave and the support wheel are configured as magnetic elements, wherein in a first state, the first transmission surface of the traction sheave and the second transmission surface of the support wheel abut against each other; and in a second state, the first transmission surface of the traction sheave and the second transmission surface of the support wheel are separated from each other.

2. The tractor assembly according to claim 1, wherein the plurality of support wheels are respectively arranged below the traction sheave along a circumferential direction of the traction sheave.

3. The tractor assembly according to claim 2, wherein the plurality of support wheels are symmetrically arranged in parallel with an axial direction of the traction sheave.

4. The tractor assembly according to claim 1, wherein the plurality of support wheels is configured as at least one support wheel group, the support wheel group comprises at least two support wheels, and each of the support wheels in the support wheel group are symmetrically arranged along a circumferential direction of the traction sheave.

5. The tractor assembly according to claim 4, wherein the plurality of support wheels is configured as two support wheel groups, and the two support wheel groups are respectively arranged in parallel with an axial direction of the traction sheave and close to two ends of the peripheral surface of the traction sheave.

6. The tractor assembly according to claim 1, wherein the peripheral surface of the traction sheave is provided with a traction means fitting surface at the middle part and is provided with a first transmission surface at the two ends respectively.

7. The tractor assembly according to claim 1, further comprising a traction means, wherein the traction means is in transmitting cooperation with the traction means fitting surface on the peripheral surface of the traction sheave and is configured to connect an elevator car and an elevator counterweight.

8. The tractor assembly according to claim 1, wherein transmission is enabled through friction between the first transmission surface of the traction sheave and the second transmission surface of the support wheel.

9. The tractor assembly according to claim 1, wherein transmission is enabled through engagement between the first transmission surface of the traction sheave and the second transmission surface of the support wheel.

10. The tractor assembly according to claim 1, wherein the traction sheave and/or the support wheel are/is provided with a guiding portion, and the traction sheave is in transmitting cooperation with the support wheel under guidance by the guiding portion.

11. The tractor assembly according to claim 7, wherein the peripheral surface of the traction sheave is provided with a first transmission surface at the middle part and is provided with a traction means fitting surface at the two ends respectively.

12. The tractor assembly according to claim 7, wherein the traction means comprises a traction belt or a traction rope.

13. The tractor assembly according to claim 7, wherein the traction means fitting surface is configured as a traction means guiding groove, and the traction means is in transmitting cooperation with the traction sheave along the traction means guiding groove.

14. The tractor assembly according to claim 1, further comprising a driving component having a stator and a rotor, wherein the rotor is fixedly connected to the traction sheave.

15. The tractor assembly according to claim 14, further comprising a mounting base, wherein the stator is mounted on the mounting base, and the mounting base and the support wheel bases are integrated.

16. The tractor assembly according to claim 14, further comprising a brake, wherein the brake is mounted on the mounting base and is controlled to brake the rotor.

17. An elevator, comprising an elevator car, an elevator counterweight, and the tractor assembly according to claim 1, wherein the tractor assembly is connected to the elevator car and the elevator counterweight respectively.

18. A tractor assembly, comprising:
a traction sheave, having a traction means fitting surface and a first transmission surface on a peripheral surface thereof;
a plurality of support wheels, configured to support the traction sheave, and each having a second transmission surface on a peripheral surface thereof; and
support wheel bases, configured to support the support wheels through support shafts,
wherein the first transmission surface of the traction sheave is in transmitting cooperation with the second transmission surfaces of the plurality of support wheels respectively;
further comprising an encoder disposed at an end portion of the support shaft and configured to count the number of rotations of the support shaft.

19. The tractor assembly according to claim 18, wherein a code of the encoder is not less than 512.

20. A tractor assembly, comprising:
a traction sheave, having a traction means fitting surface and a first transmission surface on a peripheral surface thereof;
a plurality of support wheels, configured to support the traction sheave, and each having a second transmission surface on a peripheral surface thereof; and
support wheel bases, configured to support the support wheels through support shafts,
wherein the first transmission surface of the traction sheave is in transmitting cooperation with the second transmission surfaces of the plurality of support wheels respectively;
wherein a linear velocity ratio of the traction sheave to the support wheel is not less than 4:1.

* * * * *